US005221805A

United States Patent [19]

Lace

[11] Patent Number: 5,221,805
[45] Date of Patent: Jun. 22, 1993

[54] ADD-ON MODIFICATION DEVICE FOR STRING INSTRUMENT PICKUP

[75] Inventor: Melvin A. Lace, Prospect Heights, Ill.

[73] Assignees: Mildred A. Lace, Prospect Heights; Thomas E. Dorn, Clarendon Hills, both of Ill. ; a part interest

[21] Appl. No.: 900,485

[22] Filed: Jun. 18, 1992

Related U.S. Application Data

[63] Continuation-in-part of Ser. No. 764,346, Sep. 23, 1991, abandoned, which is a continuation-in-part of Ser. No. 597,899, Oct. 10, 1990, abandoned.

[51] Int. Cl.[5] ........ G01H 3/18
[52] U.S. Cl. ........ 84/726
[58] Field of Search ........ 84/723, 725-729, 84/743; 336/83, 90, DIG. 2

[56] References Cited

U.S. PATENT DOCUMENTS

| | | | |
|---|---|---|---|
| 3,041,483 | 6/1962 | Ebbinghaus et al. | 310/15 |
| 4,026,170 | 5/1977 | Fuller | 84/726 |
| 4,145,944 | 3/1979 | Helpinstill | 84/726 |
| 4,320,681 | 3/1982 | Altilio | 84/726 |
| 4,809,578 | 3/1989 | Lace, Jr. | 84/726 |
| 4,852,444 | 8/1989 | Hoover | 84/DIG. 10 X |
| 4,878,412 | 11/1989 | Resnick | 84/726 |
| 5,072,646 | 12/1991 | Valkama | 84/726 |

*Primary Examiner*—Jonathan Wysocki
*Assistant Examiner*—Jeffrey W. Donels
*Attorney, Agent, or Firm*—Kinzer, Plyer, Dorn, McEachran and Jambor

[57] ABSTRACT

An add-on device that modifies the operating characteristics (e.g., amplitude, frequency response, "sustain") of the output signal of an electromagnetic pickup for a stringed musical instrument, such as a guitar with steel strings; the modification device includes one or more transversely magnetized thin, flat permanent magnets. The signal modification device covers most or all of the top surface of an electromagnetic pickup. In one form the signal modification device comprises a thin, flat permanent magnet member formed of resin impregnated with particulate permanent magnet material and magnetized transversely to its thin dimension, either uniformly or in a predetermined pattern; in another form the device includes one or more discrete thin, flat permanent magnets for each instrument string, mounted on a base sheet that may also have permanent magnet characteristics or that may be non-magnetic. The add-on device may include one or more mounting elements for mounting it on a pickup; in the simplest form the mounting element may comprise a rim or one or more steel plates. The steel plate(s) may also function to modify the output signal of the pickup.

47 Claims, 4 Drawing Sheets

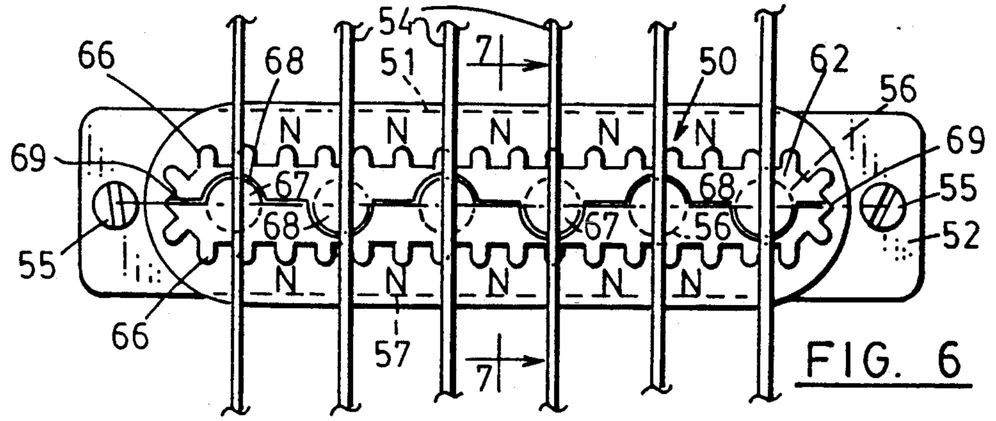
FIG. 6
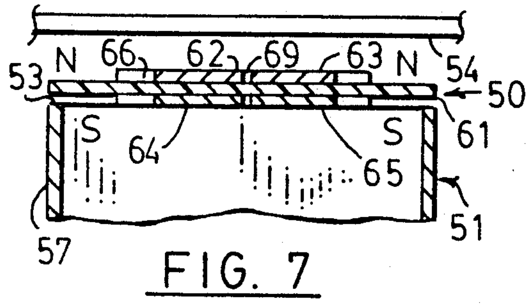
FIG. 7
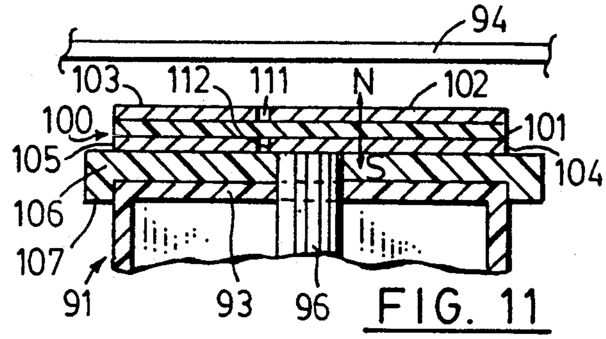
FIG. 11
FIG. 8
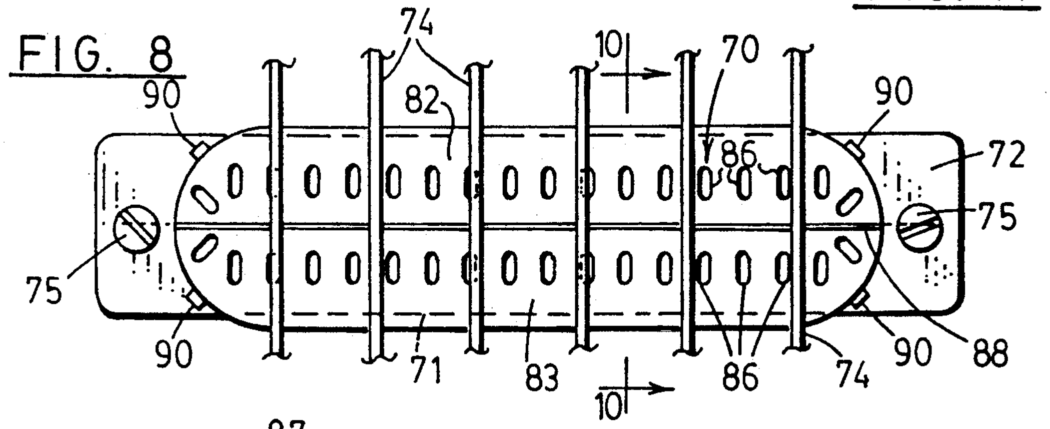
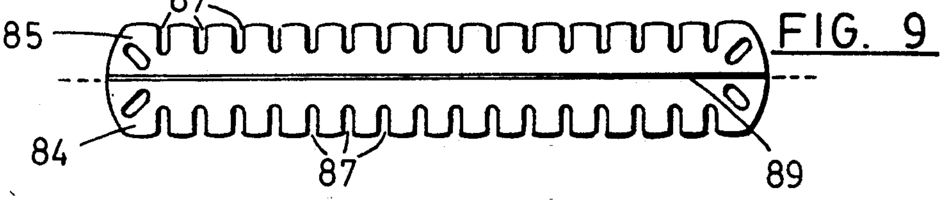
FIG. 9
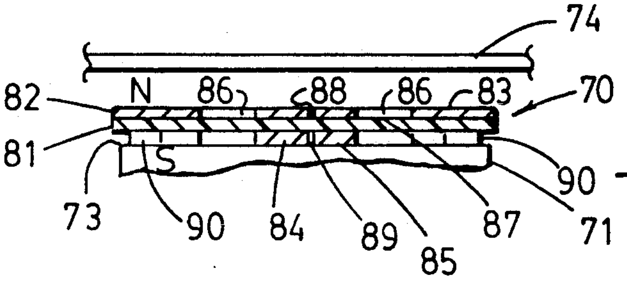
FIG. 10

ADD-ON MODIFICATION DEVICE FOR STRING INSTRUMENT PICKUP

This application is a continuation-in-part of application Ser. No. 07/764,346 filed Sep. 23, 1991, now abandoned which in turn was a continuation-in-part of application Ser. No. 07/597,899 filed Oct. 10, 1990, now abandoned.

BACKGROUND OF THE INVENTION

For many years, electromagnetic pickups have been utilized on musical instruments having steel strings. Such pickups have been employed with guitars, bass guitars, banjos, mandolins, and a variety of other instruments. An electromagnetic pickup for a musical instrument incorporates a magnetic structure for generating a magnetic field that intersects a portion of the instrument strings; the magnetic structure of the pickup includes at least one permanent magnet and frequently has a separate high-permeability pole piece for each string. On the other hand, some electromagnetic pickups have a single pole that spans a number of strings. The pickup has an electrical coil or coils to generate a signal which is subsequently amplified and reproduced by a speaker or other transducer as the audio output of the musical instrument. The coils are customarily disposed in encompassing relation to the magnetic core or cores. This relatively simple electromagnetic structure is fitted into a housing that may or may not be part of the magnetic structure. Whether or not a part of the magnetic structure, a principal purpose of the housing is to protect the pickup from dirt and other contaminants.

A wide variety of individual constructions have been used for electromagnetic pickups employed with musical instruments such as guitars. Frequently, the efforts of the pickup designer have been directed toward achieving an output signal from the electrical coil that is as close as possible to a faithful reproduction of the sound that would be developed by the instrument functioning as an acoustical device. This is not always the case, however; some electromagnetic pickups have been designed to give a particular distortion deemed desirable by the designer or by a musician.

For electromagnetic pickups in general, as applied to musical instruments having steel or other ferromagnetic strings, there may be a problem in obtaining an output signal of sufficient amplitude. This may be a minor problem, with modern electronic technology, because a very weak signal can often be adequately amplified. On the other hand, a reasonable output amplitude is desirable because it reduces the necessity for subsequent amplification, and thus reduces the likelihood of inadequately controlled distortion. An output signal of appreciable amplitude also aids in achieving an acceptable signal-to-noise ratio A more pronounced problem, in most electromagnetic pickups for musical instruments has to do with the frequency response. The overall "sound" derived from the output signal is usually critical to the requirements of the musician. Some musicians want to have the output signal as close as possible to the acoustic output of the instrument, at least in theory. Others, however, want to have a distortion that is acceptable to them, one that represents their own concept or technique for interpretation of music. The frequency response characteristics of the pickup are critical in this regard. A similar situation is presented by the sound characteristic known to musicians as "sustain"; sometimes accented "sustain" is desirable in the view of the musician using the pickup and sometimes it is not.

SUMMARY OF THE INVENTION

It is a primary object of the invention, therefore, to provide a new and improved add-on device for modifying at least one of the amplitude, frequency, and "sustain" characteristics of the output signal of an electromagnetic pickup for a musical instrument having a plurality of magnetic strings, an add-on device which can be employed with a variety of different pickup constructions.

Another object of the invention is to provide a new and improved add-on modification device for an electromagnetic pickup for a plural magnetic string musical instrument that appreciably increases the amplitude of the output signal, regardless of substantial variations in the construction and operation of the pickup itself.

Another object of the invention is to provide a new and improved add-on signal modification device for an electromagnetic pickup for a musical instrument having plural electromagnetic strings that produces different frequency emphasis effects in the output signal from the electromagnetic pickup.

A specific object of the invention is to provide a new and improved add-on modification device for an electromagnetic pickup for a plural magnetic string instrument, particularly a guitar, that is simple and inexpensive in construction, that can be readily mounted upon a pickup, and that has indefinite life, producing the effects noted above without requiring any change in the pickup itself.

Accordingly, the invention relates to an add-on signal modification device for modifying at least one of the amplitude, frequency, and "sustain" characteristics of the output signal of an electromagnetic pickup for a musical instrument having a plurality of magnetic strings. The pickup includes a magnetic structure for generating a magnetic field, the magnetic structure including at least one permanent magnet, at least one pole piece (the magnet may be the pole piece), and an electrical pickup coil disposed in encompassing relation to the pole piece, all mounted in a housing adapted for mounting on a musical instrument with the top of the pickup facing the magnetic strings and the magnetic field of the pickup intersecting a predetermined portion of the strings so that vibration of each string generates an electrical output signal in the coil. The pickup has a top of predetermined size and configuration. The add-on signal modification device comprises a thin, flat, permanent magnet member, magnetized transversely to its thin dimension. Mounting means are provided for mounting the permanent magnet member of the signal modification device on top of the pickup, between the pickup and the strings, so that the magnetic field of the permanent magnet member modifies the magnetic field of the pickup and thereby modifies the output signal of the pickup.

BRIEF DESCRIPTION OF THE DRAWINGS

FIG. 6 is a plan view of a different embodiment of the invention;

FIG. 7 is a sectional view taken approximately as indicated by line 7—7 in FIG. 6;

FIG. 8 is a plan view of yet another embodiment of the invention;

FIG. 9 is a bottom view of a component that may be employed in the device of FIG. 8;

FIG. 10 is a sectional view taken approximately as indicated by line 10—10 in FIG. 8;

FIG. 11 is a sectional view illustrating a further embodiment of the invention;

DESCRIPTION OF THE PREFERRED EMBODIMENTS

Figure 1:
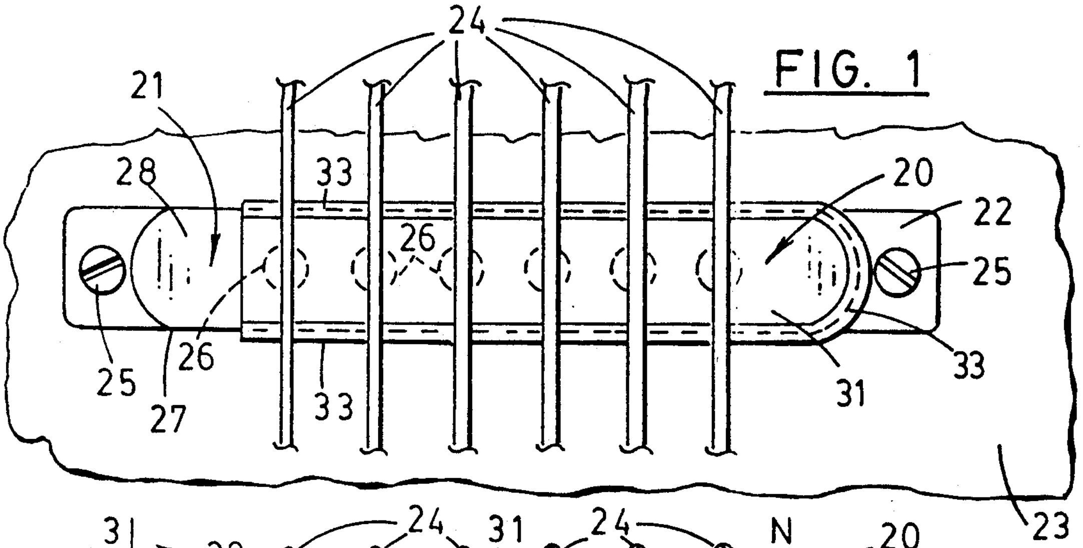
FIG. 1 is a plan view of an electromagnetic pickup for a guitar, equipped with an add-on signal modification device constructed in accordance with one embodiment of the present invention.
Figure 2:
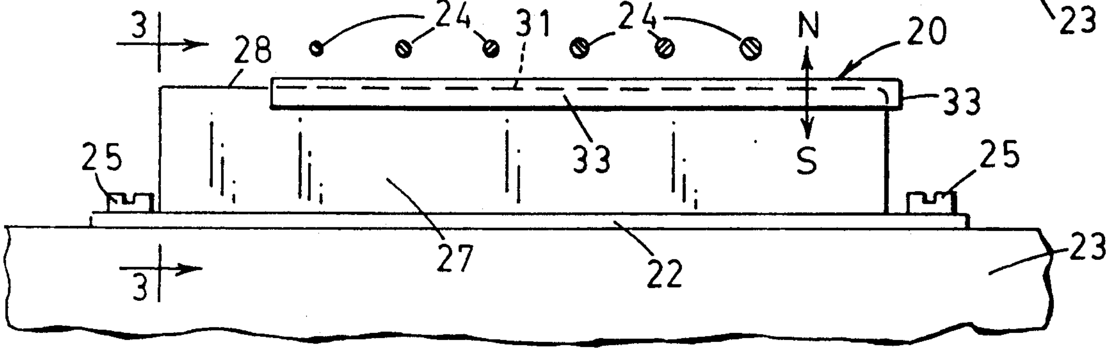
FIG. 2 is a side elevation view of the pickup and the add-on signal modification device of FIG. 1.
Figure 3:
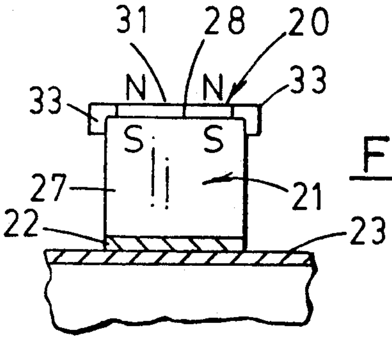
FIG. 3 is a detail view taken approximately as indicated by line 3—3 in FIG. 2.

FIGS. 1-3 illustrate a signal modification device 20 constructed in accordance with a first embodiment of the present invention, mounted as an add-on device upon an electromagnetic pickup 21 for a musical instrument (e.g., a guitar). Pickup 21 has a base plate 22 that is affixed to the top 23 of a musical instrument having a plurality of magnetic strings 24. Thus, strings 24 may be the strings of a guitar, the strings extending above and in spaced relation to the top surface 23 of the guitar neck or body, depending upon where the pickup is mounted. Appropriate mounting devices 25 secure pickup 21 on the guitar body 23.

As previously noted, a wide variety of different magnetic constructions have been utilized for the electromagnetic pickup 21. Consequently, no specific magnetic structure has been shown for the pickup in FIGS. 1-3. However, any electromagnetic pickup 21 on which the signal modification device 20 may be employed should include a magnetic structure for generating a magnetic field, that magnetic structure including at least one permanent magnet and at least one pole piece; the magnet may be the pole piece. For the construction shown in FIG. 1, it is assumed that there are six pole pieces 26, one for each string 24 (see FIG. 1). On the other hand, as previously discussed, a single pole piece may serve all of the strings 24.

Pickup 21 includes an electrical pickup coil, not shown, that is disposed in encompassing relation to the pole pieces 26. In some constructions there may be six separate coils, all connected together. All operating elements of pickup 21, including the pole pieces, the permanent magnet (or magnets), and the electrical pickup coil (or coils), are disposed in a single pickup housing 27 that includes base 22. Fasteners 25 thus mount housing 27 on the surface 23 of the guitar s that the top surface 28 of the pickup housing faces strings 24 and the magnetic field or fields generated by pickup 21 intersect strings 24. Consequently, vibrations of strings 24 generate electrical output signals in the coil of pickup 21, in the usual manner.

The add-on modification device 20, one embodiment of the present invention, is quite simple in construction. It comprises a thin, flat permanent magnet sheet 31. Usually, sheet 31 is formed of a resin material, preferably relatively flexible and slightly elastomeric, that has been heavily impregnated with particulate permanent magnet material. Such permanent magnet resin sheets are readily available commercially. One acceptable permanent magnet resin material is made and sold by 3M Company under the trademark PLASTIFORM; another permanent magnet resin material that may be utilized in device 20 for the permanent magnet 31 is made and sold by B.F. Goodrich Company under the trademark KOROSEAL. A permanent magnet resin material of this kind typically has a maximum energy product (BH) of 1.6 or less; the material is paramagnetic and has a permeability only slightly above unity. A permeability of 1.07 is typical.

As indicated in FIGS. 2 and 3, the permanent magnet strip or sheet 31 is magnetized transversely to its thin dimension; thus, sheet 31 is magnetized vertically as shown in these two figures. The permanent magnet strip has a configuration corresponding approximately to that of the top surface 28 of pickup housing 27; some variation is acceptable. Thus the permanent magnet sheet 31 covers most of the top surface 28 of pickup 21 and preferably covers all of that part of the pickup housing surface 28 that is located below strings 24. In the add-on modification device 20 of FIGS. 1-3, the permanent magnet 31 is shown as being slightly narrower and somewhat shorter than pickup housing surface 28; it should be nearly as wide as the housing and, indeed, may exceed both the housing width and housing length slightly.

The modification device 20, being designed for addition to an existing pickup, preferably includes mounting means, affixed to the permanent magnet sheet 31, for mounting that sheet on the top surface 28 of a pickup housing, such as the housing 27 of pickup 21. In the construction shown in FIGS. 1-3, the mounting means comprises an edge portion or rim 33 that is affixed to three sides of the permanent magnet sheet 31. This edge portion 33 of device 20 may be formed of molded or extruded resin and can be joined to the edges of permanent magnet sheet 31 by adhesive bonding, ultrasonic welding, or any other desired bonding technique The edge portion 33 of device 20 extends down along the side walls of housing 27 for pickup 21 and serves as an aid to anchoring permanent magnet sheet 31 of device 20 on the top 28 of pickup 21. The magnetic field of permanent magnet 21 also plays a major part in maintaining the permanent magnet sheet 31 on the top of housing 27, due to magnetic attraction between pickup poles 26 and the add-on magnet 31. For this purpose it may be necessary to magnetize sheet 31 in the opposite direction to that illustrated in FIGS. 2 and 3, depending upon the orientation of the permanent magnet fields in poles 26 of pickup 21.

The operational effect of the add-on signal modification device 20 on pickup 21 depends in part on the normal construction and operational of the pickup. For virtually any pickup construction, device 20 materially increases the amplitude of the output signal. In addition, the add-on modification device 20 usually affects the frequency response of pickup 21 so that its output signal places greater emphasis upon either high or low frequency components, depending upon the specific construction employed in the pickup. Some experimentation may be necessary in this regard. In addition to altering the frequency response, in most instances, device 20 modifies the "sustain" characteristics for the output signal from electromagnetic pickup 21.

Figure 4:
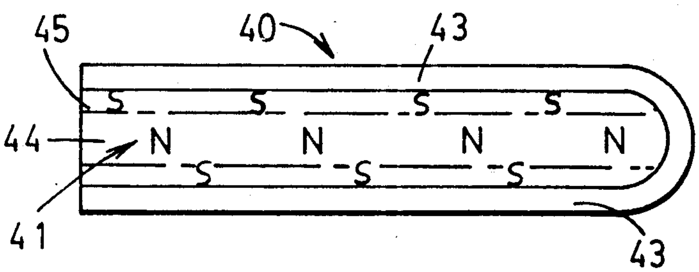
FIG. 4 is a plan view of an add-on signal modification device, for an electromagnetic pickup, constructed in accordance with another embodiment of the invention.
Figure 5:
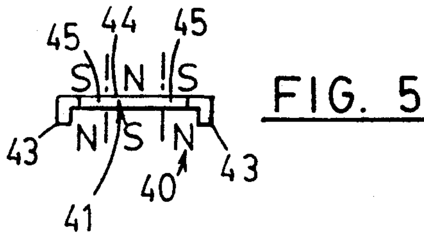
FIG. 5 is an end view of the device of FIG. 4.
Figure 15:
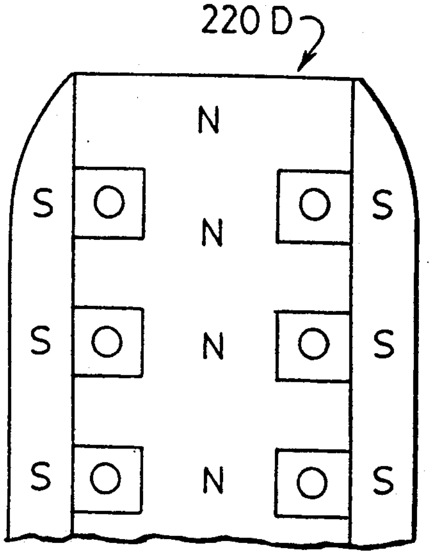
FIGS. 12-15 illustrate other modifications of the magnetization patterns that can be used in the invention, particularly the add-on signal modification devices of FIGS. 1-5.
Figure 14:
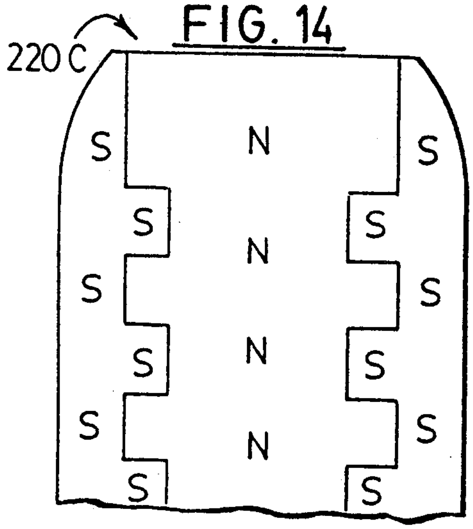

FIGS. 4 and 5 illustrate another add-on signal modification device 40 constructed in accordance with the invention. Device 40 can be substituted directly for device 20 in FIGS. 1-3. The overall effect on the output from electromagnetic pickup 21 may be appreciably different, however, when device 40 is used, from that afforded by the previously described modification device 20.

Device 40 comprises a thin, flat permanent magnet sheet 41. Again, sheet 41 may be formed of a flexible resin impregnated with particulate permanent magnet material. That is, sheet 41 may be formed of the same kinds of permanent magnet materials as the sheet 31 of device 20. Moreover, the permanent magnet sheet 41 of modification device 40 is again magnetized in a direction transverse to its thin dimension. However, the magnetization of the permanent magnet 41 is not uniform throughout its surface. Thus, the central portion 44 of the permanent magnet strip or sheet 41 is magnetized so that its upper, outer surface constitutes a north pole and its inner, lower surface, facing a pickup, is a south pole. On each side of sheet 41, however, there is a narrow strip 45 that is magnetized in the opposite direction. Thus, each side strip 45 of sheet 41 is magnetized so that its upper, outer surface is a south pole and its lower, inner surface is a north pole. As before, the permanent magnet sheet 41 may be provided with a rim 43 to aid in mounting the sheet on an electromagnetic musical instrument pickup (e.g., pickup 21, FIGS. 1-3).

The add-on signal modification device 40 of FIGS. 4 and 5, like device 20 of FIGS. 1-3, usually increases the amplitude of the output signal from an electromagnetic musical instrument pickup with which it is associated, such as pickup 21 of FIGS. 1-3. It also modifies the frequency and "sustain" response characteristics of the pickup. As before, the overall effect on these response characteristics of the pickup depend in substantial part upon the construction employed in the pickup itself, as well as the construction of the modification device 40.

FIGS. 6 and 7 illustrate another signal modification device 50, used as an add-on device for modifying operating characteristics of the output signal from an electromagnetic pickup 51 for a stringed musical instrument. In FIGS. 6 and 7 the add-on device 50 is shown mounted on top of the housing 57 of the electromagnetic pickup 51, the pickup being secured to the surface of a guitar, banjo, or other like musical instrument by appropriate fasteners 55 that extend through a base plate 52 for the pickup (FIG. 6) The strings 54 of the instrument, which of course must also be of steel or other magnetically permeable material, extend across but are spaced from the top 53 of the pickup housing 57; see FIG. 7.

The add-on signal modification device 50 includes a thin, flat, permanent magnet sheet 61 of the same type as used in previously described embodiments. Permanent magnet 61 is magnetized transversely to its thin dimension and has a configuration approximately corresponding to that of the top surface 53 of pickup 51. Like permanent magnet 31 of the embodiment of FIGS. 1-3, permanent magnet 61 may be uniformly magnetized throughout its area.

Pickup device 50, however, includes four steel strips 62, 63, 64 and 65. Each of these steel strips 62-65 should be formed from ferromagnetic stock. Each includes a multiplicity of external projections 66 along the edge of the strip. Each of the steel strips 62-65 also includes a plurality of central projections 67 that are received in indentations 68 in the mating steel strip. Thus, as shown in FIG. 6, the ferromagnetic strip 62 has a plurality of projections 67 that fit into indentations 68 in the strip 63 that is aligned with strip 62 on top of permanent magnet 61. Similarly, strip 63 has a plurality of projections 67 that fit into indentations 68 in strip 62. Each projection 67 is aligned with one of the strings 54 of the musical instrument o which pickup 51 is mounted. The overall result is a space 69, shown exaggerated in FIG. 7, between the two steel strips 62 and 63; space 69 extends for the full length of the signal modification device 50, with one of the projections 67 under each string 54 (FIG. 6). The strips 64 and 65 on the opposite side of permanent magnet 61 (FIG. 7) have the same configuration as the upper, outer strips 62 and 63 and are preferably aligned with the upper, outer strips. Thus, device 50 can be mounted on housing 53 with strips 62 add 63 facing strings 54, as shown, or may be mounted with strips 64 and 65 facing the strings if the polarity of the pickup poles 56 requires reversal of magnet 61.

The add-on signal modification device 50, FIGS. 6 and 7, has the effect of increasing the amplitude of the pickup output signal; in that respect, it is similar to the modification devices of previous figures. For a pickup with individual magnet poles for the individual instrument strings 54, such as poles 56 (FIG. 6), steel plates 62-65 modify overall operation so that the output signal from pickup 51 exhibits characteristics more closely simulating those of a single-core electromagnetic pickup as in U.S. Pat. No. 4,809,578, even though the pickup itself may be a multi-pole device like that shown in U.S. Pat. No. 3,236,930. Stated differently, the ferromagnetic plates 62-65 function as a mounting means to aid in affixing permanent magnet 61 to pickup 51 and also have a substantial effect on the frequency and "sustain" response characteristics of the output signal from pickup 51.

FIGS. 8-10 illustrate another add-on signal modification device 70 for modifying the operational characteristics of the output signal of an electromagnetic pickup 71. It may be assumed that pickup 71 employs an internal construction of the kind described in U.S. Pat. No. 4,809,578, which has a single elongated central core or pole piece that spans all of the strings 74 of a guitar or other musical instrument on which pickup 71 is mounted. Pickup 71 has a base 72 (FIG. 8) with fasteners 75 used to mount the base on the surface of a guitar or like instrument (not shown). Modification device 70 is mounted on the top of pickup 71; see FIG. 10.

Device 70 includes a thin, flat permanent magnet 81 (FIG. 10). This permanent magnet is preferably formed from a sheet of elastomeric resin impregnated with particulate permanent magnet material, such as the aforementioned PLASTIFORM and KOROSEAL materials. As in the previously described embodiments, the permanent magnet sheet 81 is magnetized in a direction transverse to its thinnest dimension; see FIG. 10. Furthermore, as is apparent from FIGS. 8 and 10, the permanent magnet sheet 81 has a configuration corresponding generally to that of the upper surface 73 of the housing of pickup device 71.

The add-on signal modification device 70 of FIGS. 8–10, being designed for use on an existing pickup 71, includes mounting means for mounting the device on the pickup; in this instance the mounting means comprises four steel sheets or strips 82–85, all affixed to the permanent magnet sheet 81. Sheets 82 and 83 are on the top surface of permanent magnet 81; each is provided with a pattern of apertures 86 corresponding to a multiplicity of projections or teeth on the central core of pickup 71 as described in the aforementioned U.S. Pat. No. 4,809,578. The steel plates or sheets 82 and 83 do not contact each other; instead, there is an elongated gap 88 between the two steel sheets. Steel sheets 84 and 85, on the other hand, are mounted on the bottom surface of permanent magnet 81. Each is provided with a plurality of indentations or slots 87 that are aligned with the apertures 86 in the two top steel strips 82 and 83. Again, the steel strips 84 and 85 do not engage each other; they are separated by a longitudinal gap 89. Modification device 70 may also include a plurality of tabs 90 affixed to the permanent magnet 81 or to the upper steel strips 82 and 83. Tabs 90 project downwardly, engaging the sides of the housing for pickup 71 to help maintain device 70 in place on the top surface 73 of the pickup.

The add-on signal modification device 70, like previously described embodiments, enhances the amplitude of the output signal from the pickup 71 with which it is used. Furthermore, device 70 modifies the frequency and "sustain" characteristics of that output signal so that the overall audio output produced by a transducer such as a loudspeaker, employing the pickup signal following amplification, has a different timbre and overall "sound" than would otherwise be obtained by pickup 71.

FIG. 11 illustrates yet another embodiment of the present invention in the form of an add-on signal modification device 100 mounted upon and utilized to modify the output of a pickup generally indicated at 91. Pickup 91 is of the type, such as the pickup shown in U.S. Pat. No. 3,236,930, that has an individual permanent magnet or permanent magnet pole for each string 94 of the musical instrument. In FIG. 11 only one of these poles or magnets 96 is shown. In this pickup construction, however, each pole 96 projects above the top wall 93 of pickup 91. As a consequence, if the signal modification device 100 were mounted only on the tops of poles 96, it would be quite unstable.

In device 100 this situation is obviated by a support member 106, preferably formed of molded resin material, that fits onto the top 93 of pickup 91. Support 106 may have rim elements 107 that engage the side walls of the housing of pickup 91 to further stabilize the mounting of device 100 on pickup 91. The modification device 101 itself comprises a thin, flat, permanent magnet sheet 101. Sheet 101 may be a resin impregnated with permanent magnet material so that the sheet is itself an effective permanent magnet. On top of sheet 101 there are two steel elements 102 and 103 separated by a longitudinal gap 111 like gap 69 in the add-on device 50 of FIGS. 6 and 7. On the bottom of permanent magnet 101 there are two similar steel elements 104 and 105 spaced from each other by a longitudinal gap 112. The configuration of the steel sheets 102–105 may be similar to those shown in FIG. 6, except that these steel sheets are preferably wider and have no external projections. On the other hand, these steel sheets 102–105 could be like the similar steel elements 82–85 of FIGS. 8–10. Yet a further configuration that may be employed for steel elements 102–105 would conform to the overall surface configuration of permanent magnet 101 except for a gap having a configuration like gap 69 in FIG. 6.

Figure 12:
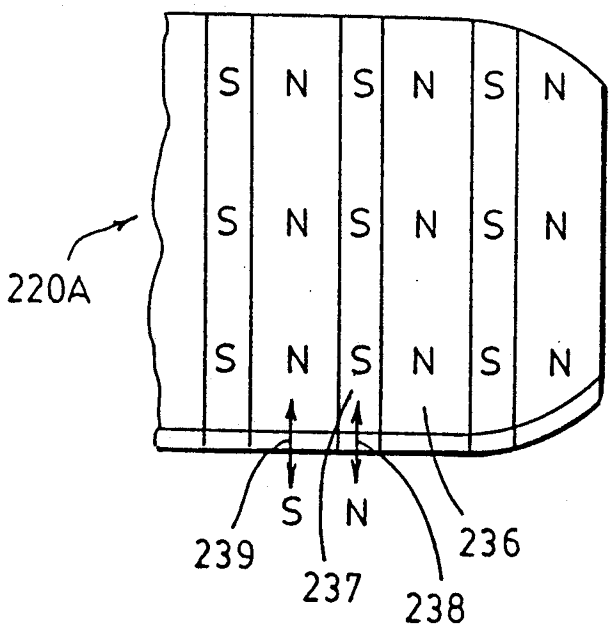

For further signal modification effects, the add-on devices 220A–220D of FIGS. 12–15, magnetized in different ways, can be used. Thus, the signal modification device 220A of FIG. 12 is magnetized in alternate transverse stripes 236 and 237 that are of opposed polarity, as indicated by the magnetization arrows 238 and 239. With this magnetization pattern, the frequency response characteristics of the output signal from the pickup are appreciably changed, depending on the alignment of stripes 236 and 237 relative to the musical instrument strings, such as strings 24, 54 and 74 (FIGS. 1, 6, and 8). The ratio of widths of stripes 236 to 237 in FIG. 12 is 2:1, but this ratio can be varied, as desired, for varying sound effects. Of course, to get the direct inverse of the magnetization pattern illustrated in FIG. 12, it is only necessary to turn device 220A over. In that way, the broad stripes 236 show south poles and the narrow stripes show north poles.

Figure 13:
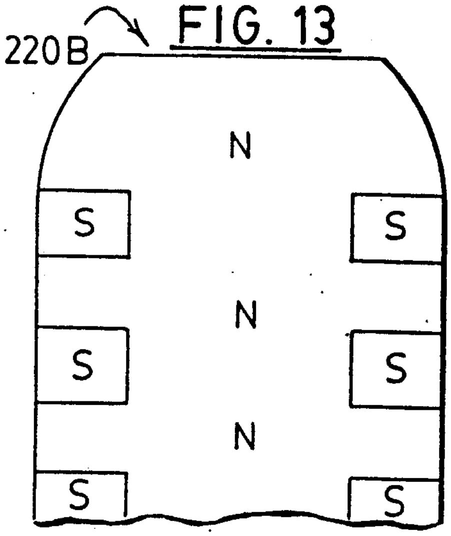

Another magnetization pattern for the permanent magnet in the signal modification device invention is shown by device 220B of FIG. 13. In this instance, in the alignment shown the major portion of the surface area of device 220B presents north poles; there is a sequence of isolated south poles on each edge. Of course, to get the inverse pattern it is only necessary to turn device 220B over. A similar but different pattern is shown for device 220C, FIG. 14. Again, with the signal modification device in the alignment shown the major central area appears as a large north pole, with smaller south pole areas along each edge of the device and individual smaller projections constituting south poles extending into the central north pole space. Again, the inverse pattern can be obtained simply by turning the signal modification device 220C over. It should be noted that it is not necessary to magnetize all of the thin, flat, permanent magnet in each of the add-on signal modification devices. Thus, device 220D, FIG. 15, has a central area which, in the alignment shown, constitutes a north pole, with edge areas of south poles, and particularly with individual unmagnetized areas designated by "O".

Figure 16:
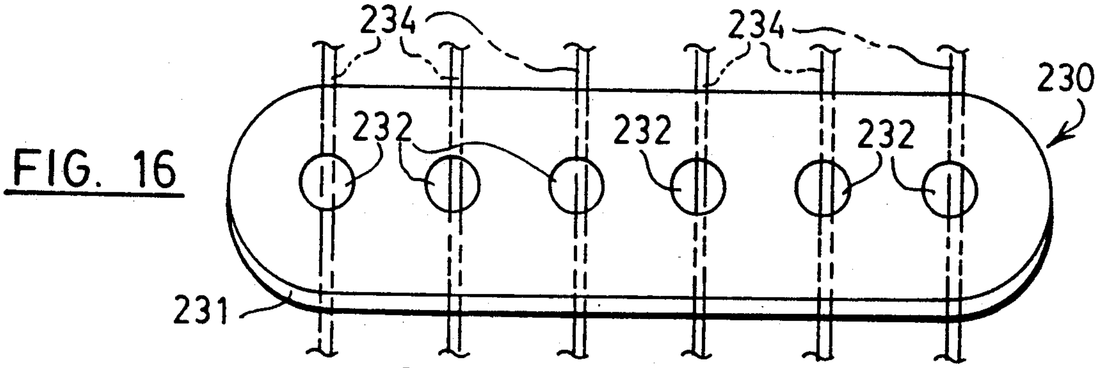
FIG. 16 is a perspective view of an add-on signal modification device according to another embodiment of the invention.

FIG. 16 is a plan view of another form in which the signal modification device of the present invention may be embodied. The add-on device 230 shown in FIG. 16 comprises a thin flat base member 231 in which a series of permanent magnet discs or "pills" 232 are mounted. Each disc 232 is a thin, flat high-energy permanent magnet; rare earth permanent magnet discs may be used, but Niodimium/Boron/Iron permanent magnet discs are even better. These high-energy permanent magnet materials, like those discussed above, are paramagnetic, with a permeability only slightly above unity, but the maximum energy product (BH) is usually in a range of 6.5 to 9. Device 230 is intended for use with a guitar; there are six discs 232, each aligned beneath one string 234 of the guitar.

The manner in which the permanent magnet discs or pills 232 are mounted in base 231 is not critical; moreover, the material used for the base sheet can be varied substantially. Each disc 232 is magnetized transversely to its thin dimension, and it is assumed the top face of each is a north pole ("N"); the reverse polarization is achieved merely by turning device 230 over. If base 231 is itself a resin matrix permanent magnet, as in prior embodiments, it may be magnetized in the same direction as discs 232 or, alternatively, in the opposite direction as indicated by the letter S in FIG. 16. But base 231 can also be an ordinary plastic or other non-magnetic material in relation to FIG. 20, in which case most of the surface area of device 230 is not permanently magnetized (it is not permanently magnetizable). Of course, the add-on signal modification device 230 can utilize a mounting rim or other mounting means and additional signal modification elements such as steel plates, as described for prior embodiments. Discs 232 typically may have a diameter of about 0.25 inch and a thickness of about 0.0625 inch. Use of round permanent magnet discs is not mandatory; "pills" 232 may be square or any other desired shape.

Figure 17:
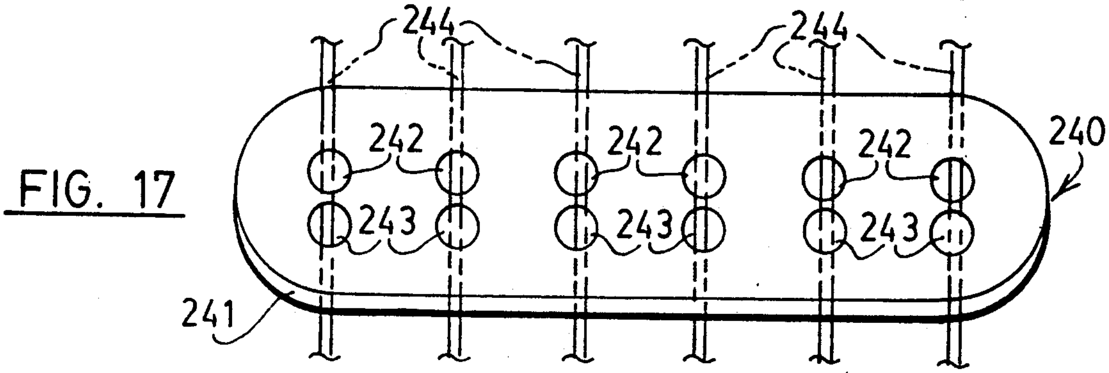
FIGS. 17-19 illustrate modifications of the device of FIG. 16.

FIG. 17 illustrates another add-on signal modification device 240 that is similar to device 230, FIG. 16. Device 240, used with a guitar having strings 244, includes a base 241 that may be a resin and permanent magnet particle matrix but that may also be an ordinary non-magnetic material such as a resin, paper, rubber, wood, etc. The difference of device 240, compared to device 230, is that there are two high-energy permanent magnet discs or "pills" 242 and 243 for each string 244. Additional permanent magnet discs can be used in the embodiment of FIG. 17. The disc diameter is usually smaller than the pills 232 of FIG. 16; typically, discs 242 and 243 may have diameters of about 0.18 inch or even less.

Figure 18:
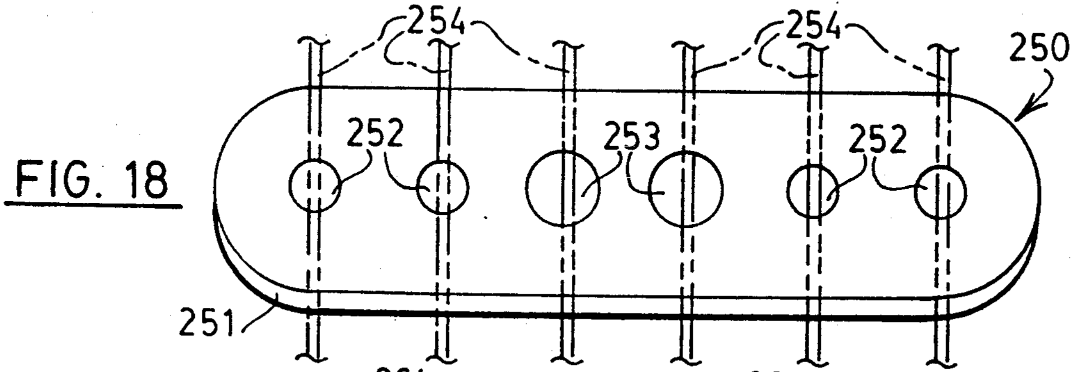

FIG. 18 illustrates an add-on device much like the devices of FIGS. 16 and 17; it includes a base 251 in which high-energy permanent magnet "pills" 252 and 253 are mounted in alignment with guitar strings 254. The distinguishing feature of device 250, FIG. 18, as compared with device 230, FIG. 16, is that the discs 253 are appreciably larger than discs 252. For example, if each disc 252 has a diameter of 0.25 inch, then each disc 253 may have a diameter of about 0.375 inch. This differential makes it possible for the add-on device 250 to emphasize the contribution of one or more strings to the composite all-string signal output of the pickup on which device 250 is used. As shown, the output contributions of the two center strings 254 would be emphasized. Essentially the same effect can be attained by increasing or decreasing the magnetization strength of some of the discs relative to others, but this is more difficult and likely to be more expensive to achieve.

Figure 19:
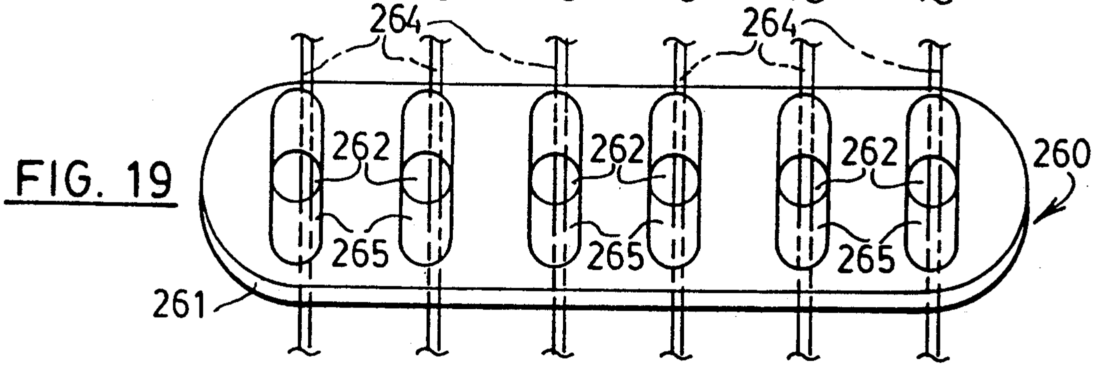

FIG. 19 presents yet another variation on the basic construction of FIG. 16. The add-on signal modification device 260 shown in FIG. 19 has a base 261 of a resin filled with permanent magnet particles. A series of discs or "pills" 262 are mounted in or on base 261, each aligned with a musical instrument string 264. In this instance a limited area 265 adjacent each pill 262 is permanently magnetized with a polarity opposite the polarization of the permanent magnet pills. Of course, the sizes and numbers of the high-energy permanent magnet discs 262 can be varied. In any of the add-on devices 240, 250 or 260 the high-energy permanent magnet of circular configuration; squares or other shapes may be used.

Figure 20:
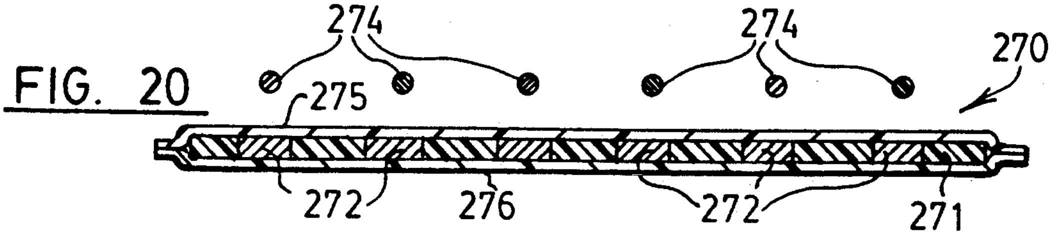
FIG. 20 is a sectional view of another modification of the device of FIG. 16.

FIG. 20 is a section view of a construction that can be used for any of the add-on devices 230, 240, 250 and 260 of FIGS. 16–19. Device 270 of FIG. 20 includes a thin, flat, resin base member 271 having the desired shape to fit over a pickup for a stringed instrument. Base 271 may be an ordinary, non-magnetizable resin or it may be a resin impregnated with permanent magnet particles and permanently magnetized across its thin dimension. A series of permanent magnet pills or discs 272 are mounted in base member 271. Alternatively, the discs 272 could be mounted on one surface of the base member 271, particularly when the base member is non-magnetic. Each disc 272 is aligned with one of the instrument strings 274. A thin resin film 275 is mounted on one surface of base member 271, over discs 272; a second thin resin film 276 covers the other surface of base member 271. Films 275 and 276 may be bonded to base member 271 (e.g. conventional heat and pressure bonding or appropriate adhesive) or may be extended a short distance beyond the periphery of the base member and bonded to each other, as shown. The protective films 275 and 276 are usually much thinner than base member 271 and/or pills 272.

In all of the embodiments described above, the signal modification device of the invention affords some enhancement amplitude of the output signal from the pickup. Furthermore, all embodiments of the invention usually modify the frequency respons and "sustain" characteristics of the pickups with which they are employed. For these add-on devices, the mounting means in each instance includes the permanent magnet or magnets used for signal modification, because the magnetic field of the permanent magnet(s) pulls the device tightly against the electromagnetic pickup due to attraction of that field for the pole pieces in the pickup. Each add-on device, as applied to an existing pickup, may also include further mounting means, such as the steel plates or rims described above for the individual embodiments of FIGS. 1–11. Of course, other add-on signal modification devices such as those of FIGS. 6–20 can also incorporate clamp rims or other appropriate mounting means.

In all described embodiments of the invention there can be appreciable variation in the dimensions of the permanent magnets used in the basic signal modification devices and of any ferromagnetic steel sheets employed with them. Typically, the permanent magnet signal modification members formed of resins impregnated with permanent magnet particles (e.g., members 31, 41, 61, 81, 101 and 220A–220D) may have a thickness of about 0.030 inch (0.076 cm). The base members 231, 241, 251, 261 and 271 may be of similar thickness, along with the disc or pills 232, 242, 243, 252, 262 and 272. The ferromagnetic sheets (e.g., steel members 62–65, 82–85, and 102–105) may be about 0.010 inch (0.025 cm) thick. Protective films 275 and 276 (FIG. 20) typically may be 0.005 inch (0.0125 cm) in thickness. These dimensions may be modified to suit the needs of the user and the manufacturer. The shapes and surface areas of the ferromagnetic steel sheets and permanent magnet sheets should be matched to some extent to the shape and size of the pickup, but precise conformity is not required, as will be apparent from the drawings. Similarly, the alignment of high-energy permanent magnet "pills" with the strings, in those embodiments that use the pills, can vary to some extent. In any embodiment that uses such pills in combination with a sheet of a permanent magnet resin matrix, the pills are inherently much stronger, magnetically, than the sheet. The add-on signal modification device of the invention is applicable to virtually any electromagnetic pickup, including those with multiple poles, unified poles, single pickup coils, plural pickup coils, and hum-bucking coils.

In the foregoing description, it is assumed that the guitar pickup on which the signal modification device is used includes a permanent magnet and an additional pole piece; that is not always the case. In some perhaps, the permanent magnet may be a part of or may constitute all of the pole piece for the pickup coil. The device of the invention works or pickups with permanent magnet pole pieces as well as on those with pole pieces that are not themselves permanent magnets. Of course, the modification device can also be applied to plural coil pickups, including humbucker pickups.

I claim:

1. An add-on signal modification device for modifying at least one of the amplitude, frequency, and reverberation characteristics of the output signal of an electromagnetic pickup for a musical instrument having a plurality of magnetic strings, the pickup including a magnetic structure for generating a magnetic field, the magnetic structure including at least one permanent magnet, at least one pole piece, and an electrical pickup coil disposed in encompassing relation to the pole piece, all mounted in a housing adapted for mounting on a musical instrument with the top of the pickup facing the magnetic strings and the magnetic field of the pickup intersecting a predetermined portion of the strings so that vibration of each string generates an electrical output signal in the coil, the pickup having a top of predetermined size and configuration, the add-on signal modification device comprising:

a thin, flat paramagnetic permanent magnet member, magnetized transversely to its thin dimension;

and mounting means for mounting the permanent magnet member of the signal modification device on top of a pickup, between the pickup and the strings, so that the magnetic field of the permanent magnet member modifies the magnetic field of the pickup and thereby modifies the output signal of the pickup.

2. A signal modification device for an electromagnetic pickup for a musical instrument having a plurality of magnetic strings, according to claim 1, in which the permanent magnet member of the signal modification device is a thin, flat, paramagnetic sheet of resin impregnated with particulate permanent magnet material.

3. A signal modification device for an electromagnetic pickup for a musical instrument having a plurality of magnetic strings, according to claim 2, in which the permanent magnet sheet is uniformly magnetized so that the entire surface of the sheet facing the pickup is of one polarity and the entire surface of the sheet facing the strings is of the opposite polarity.

4. A signal modification device for an electromagnetic pickup for a musical instrument having a plurality of magnetic strings, according to claim 2, in which the permanent magnet sheet is magnetized transversely to its thin dimension in a pattern such that parts of the surface area of that permanent magnet sheet facing the pickup have one polarity and other parts of the surface area of that permanent magnet sheet facing the pickup have the opposite polarity.

5. A signal modification device for an electromagnetic pickup for a musical instrument having a plurality of magnetic strings, according to claim 4, in which a central longitudinal part of the permanent magnet sheet is magnetized in one direction and at least one edge longitudinal part of the permanent magnet sheet is magnetized in the opposite direction.

6. A signal modification device for an electromagnetic pickup for a musical instrument having a plurality of magnetic strings, according to claim 5, in which both longitudinal edges of the permanent magnet sheet are magnetized in the opposite direction from the central longitudinal part of the permanent magnet.

7. A signal modification device for an electromagnetic pickup for a musical instrument having a plurality of magnetic strings, according to claim 4, in which at least a portion of the permanent magnet sheet is unmagnetized so that parts of the surface area of that permanent magnet sheet facing the pickup have n polarization.

8. A signal modification device for an electromagnetic pickup for a musical instrument having a plurality of magnetic strings, according to claim 4, in which laterally transverse parts of the permanent magnet sheet are magnetized in one direction and are interspersed with laterally transverse parts of the permanent magnet sheet magnetized in the opposite direction, so that the permanent magnet sheet presents alternating transverse stripes of opposite polarity to the pickup and to the strings.

9. A signal modification device for an electromagnetic pickup for a musical instrument having a plurality of magnetic strings, according to claim 2, in which the mounting means comprises at least one rim element, affixed to an edge of the permanent magnet sheet, for mounting on the pickup.

10. A signal modification device for an electromagnetic pickup for a musical instrument having a plurality of magnetic strings, according to claim 9, in which the rim element engages the side of the pickup device housing.

11. A signal modification device for an electromagnetic pickup for a musical instrument having a plurality of magnetic strings, according to claim 10, in which the rim element is of elongated configuration and engages a major portion of one side of the pickup housing.

12. A signal modification device for an electromagnetic pickup for a musical instrument having a plurality of magnetic strings, according to claim 10, in which there are at least two rim elements engaging opposite sides of the pickup housing.

13. A signal modification device for an electromagnetic pickup for a musical instrument having a plurality of magnetic strings, according to claim 2, in which the device further comprises a thin, flat sheet of ferromagnetic material, other than a permanent magnet material, affixed to and extending across a substantial part of one surface area of the permanent magnet sheet.

14. A signal modification device for an electromagnetic pickup for a musical instrument having a plurality of magnetic strings, according to claim 13 in which the further ferromagnetic sheet comprises two ferromagnetic sheet members aligned with each other and spaced from each other by a short air gap extending transversely to the strings.

15. A signal modification device for an electromagnetic pickup for a musical instrument having a plurality of magnetic strings, according to claim 14, for use with a pickup having a plurality of magnetic poles, one for each string, in which each further ferromagnetic sheet member includes a plurality of apertures, each aperture aligned with one pickup pole.

16. A signal modification device for an electromagnetic pickup for a musical instrument having a plurality of magnetic strings, according to claim 14, for use with a musical instrument having n strings and a pickup having n poles, in which each ferromagnetic sheet member includes n/2 apertures aligned with alternate pickup poles, the apertures in one ferromagnetic sheet member being aligned with different poles than the apertures in the other ferromagnetic sheet member.

17. A signal modification device for an electromagnetic pickup for a musical instrument having a plurality of magnetic strings, according to claim 16, in which each ferromagnetic sheet member also includes n/2 projections aligned with and extending into the apertures in the other ferromagnetic sheet member.

18. A signal modification device for an electromagnetic pickup for a musical instrument having a plurality of magnetic strings, according to claim 17 in which each of the two ferromagnetic sheet members is smaller than the permanent magnet sheet and includes a multiplicity of peripheral projections extending from the ferromagnetic sheet member toward one side edge of the permanent magnet sheet.

19. A signal modification device for an electromagnetic pickup for a musical instrument having a plurality of magnetic strings, according to claim 13, in which the further sheet of ferromagnetic material includes a multiplicity of apertures, plural apertures for each string.

20. A signal modification device for an electromagnetic pickup for a musical instrument having a plurality of magnetic strings, according to claim 19, in which the further ferromagnetic sheet comprises two ferromagnetic sheet members aligned with each other and spaced from each other by a short air gap extending transversely to all of the strings.

21. A signal modification device for an electromagnetic pickup for a musical instrument having a plurality of magnetic strings, according to claim 2, in which the device further comprises two thin, flat sheets of ferromagnetic material, other than permanent magnet material, affixed to and extending along opposite sides of the permanent magnet sheet, one ferromagnetic sheet engaging the top surface of the pickup and the other facing the strings, each ferromagnetic sheet covering a substantial portion of a surface of the permanent magnet sheet.

22. A signal modification device for an electromagnetic pickup for a musical instrument having a plurality of magnetic strings, according to claim 21, in which each further ferromagnetic sheet comprises two ferromagnetic sheet members aligned with each other and spaced from each other by a short air gap extending transversely to the strings.

23. A signal modification device for an electromagnetic pickup for a musical instrument having a plurality of magnetic strings, according to claim 22, for use with a pickup having a plurality of magnetic poles, one for each string, in which each further ferromagnetic sheet member includes a plurality of apertures, each aperture aligned with one pickup pole.

24. A signal modification device for an electromagnetic pickup for a musical instrument having a plurality of magnetic strings, according to claim 23, for use with a musical instrument having n strings and a pickup having n poles, in which each ferromagnetic sheet member includes n/2 apertures aligned with alternate pickup poles, the apertures in one ferromagnetic sheet member being aligned with different poles than the apertures in the other ferromagnetic sheet member.

25. A signal modification device for an electromagnetic pickup for a musical instrument having a plurality of magnetic strings, according to claim 24 in which each ferromagnetic sheet member also includes n/2 projections aligned with and extending into the apertures in the other ferromagnetic sheet member.

26. A signal modification device for an electromagnetic pickup for a musical instrument having a plurality of magnetic string, according to claim 25, in which each of the ferromagnetic sheet members is appreciably smaller than the permanent magnet sheet and includes a multiplicity of peripheral projections extending from the ferromagnetic sheet member toward one side edge of the permanent magnet sheet.

27. A signal modification device for an electromagnetic pickup for a musical instrument having a plurality of magnetic strings, according to claim 21, in which each sheet of ferromagnetic material includes a multiplicity of apertures, plural apertures for each string.

28. A signal modification device for an electromagnetic pickup for a musical instrument having a plurality of magnetic strings, according to claim 2, for use with a pickup having at least one magnetic pickup pole projecting a given height above the pickup housing, in which the mounting means includes a support member having a thickness approximately equal to that given height, through which the pickup pole projects, for supporting the permanent magnet above the top of the pickup pole.

29. A signal modification device for an electromagnetic pickup for a musical instrument having a plurality of magnetic strings, according to claim 28, for use with a pickup having plural magnetic pickup poles, one for each string, in which the support member has plural apertures, one for each pickup pole.

30. A signal modificaiton device for an electromagnetic pickup for a musical instrument having a plurality of magnetic strings, according to claim 2, in which the signal modification device further comprises at least one thin, non-magnetic film covering one side of the permanent magnet member and bonded to the permanent magnet member to protect the signal modification device.

31. An add-on signal modification device for modifying at least one of the amplitude, frequency, and reverberation characteristics of the output signal of an electromagnetic pickup for a musical instrument having a plurality of magnetic strings, the pickup including a magnetic structure for generating a magnetic field, the magnetic structure including at least one permanent magnet, at least one pole piece, and an electrical pickup coil disposed in encompassing relation to the pole piece, all mounted in a housing adapted for mounting on a musical instrument with the to surface of the pickup facing the magnetic strings and the magnetic field of the pickup intersecting a predetermined portion of the strings so that vibration of each string generates an electrical output signal in the coil, the pickup having a top of predetermined size and configuration, the signal modification device comprising:

a thin, flat base member having a configuration and size corresponding generally to that of the pickup top;

and at least one thin, flat, paramagnetic principal permanent magnet member, magnetized transversely to its thin dimension, mounted on the base member in alignment with at least one of the strings, the modification device being adapted for mounting of the base member on the top of the pickup between the pickup and the strings so that the magnetic field of the permanent magnet member of the modification device modifies the magnetic field of the pickup and thereby modifies the output signal of the pickup.

32. A signal modification device for a electromagnetic pickup for a musical instrument having a plurality of magnetic strings, according to claim 31, in which the base member is formed of a non-magnetic material.

33. A signal modification device for an electromagnetic pickup for a musical instrument having a plurality of magnetic strings, according to claim 32, in which the non-magnetic material of the base member is a resin.

34. A signal modification device for an electromagnetic pickup for a musical instrument having a plurality of magnetic strings, according to claim 33, in which the signal modification device further comprises at least one thin, non-magnetic film covering one side of the base member and bonded to the base member to protect the signal modification device.

35. A signal modification device for an electromagnetic pickup for a musical instrument having a plurality of magnetic strings, according to claim 31, in which the signal modification, device comprises a plurality of thin, flat, paramagnetic high energy principal permanent magnet members each mounted on the base member with at least one principal permanent magnet member aligned with each string.

36. A signal modification device for an electromagnetic pickup for a musical instrument having a plurality of magnetic strings, according to claim 35, in which the base member is formed of a non-magnetic material.

37. A signal modification device for an electromagnetic pickup for a musical instrument having a plurality of magnetic strings, according to claim 36, in which the non-magnetic material of the base member is a resin.

38. A signal modification device for an electromagnetic pickup for a musical instrument having a plurality of magnetic strings, according to claim 37, in which the signal modification device further comprises at least one thin, non-magnetic film covering one side of the base member and bonded to the base member to protect the signal modification device.

39. A signal modification device for an electromagnetic pickup for a musical instrument having a plurality of magnetic strings, according to claim 35, in which the base member is a sheet of resin impregnated with particulate permanent magnet material that affords a paramagnetic permanent magnet of much lower energy than the principal permanent magnets and in which at least a portion of the base member is magnetized in a direction transverse to its thin dimension.

40. A signal modification device for an electromagnetic pickup for a musical instrument having a plurality of magnetic strings, according to claim 39, for use with a musical instrument having n strings, the signal modification device having at least n principal permanent magnet members, and further having n portions of the base member, each aligned with one string, magnetized in a direction transverse to the thin dimension of the base member.

41. A signal modification device for an electromagnetic pickup for a musical instrument having a plurality of magnetic strings, according to claim 40, in which the signal modification device further comprises a least one thin, non-magnetic film covering one side of the base member and bonded to the base member to protect the signal modification device

42. A signal modification device for an electromagnetic pickup for a musical instrument having a plurality of magnetic strings, according to claim 35, in which the surface area of principal permanent magnet members for some of the strings is different than for other strings.

43. A signal modification device for an electromagnetic pickup for a musical instrument having a plurality of magnetic strings, according to claim 31, in which the device further comprises mounting means, affixed to the base member, for mounting the base member on the top of the pickup.

44. A signal modification device for an electromagnetic pickup for a musical instrument having a plurality of magnetic strings, according to claim 43, in which the mounting means includes at least one rim element on the base member that engages the side of the pickup device housing.

45. A signal modification device for an electromagnetic pickup for a musical instrument having a plurality of magnetic strings, according to claim 44, in which the rim element is of elongated configuration and engages a major portion of one side of the pickup housing.

46. A signal modification device for an electromagnetic pickup for a musical instrument having a plurality of magnetic strings, according to claim 44, in which there are at least two rim elements engaging opposite sides of the pickup housing.

47. A signal modification device for an electromagnetic pickup for a musical instrument having a plurality of magnetic strings, according to claim 31, in which the signal modification device further comprises at least one thin, non-magnetic film covering one side of the base member and bonded to the base member to protect the signal modification device.

* * * * *